United States Patent
Alvi et al.

(10) Patent No.: US 12,139,040 B2
(45) Date of Patent: Nov. 12, 2024

(54) ELECTRIC DRIVE WITH DUAL-ENERGY STORAGE AND VARIABLE INVERTER INPUT

(71) Applicant: GM GLOBAL TECHNOLOGY OPERATIONS LLC, Detroit, MI (US)

(72) Inventors: Muhammad Hussain Alvi, Troy, MI (US); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 18/076,455

(22) Filed: Dec. 7, 2022

(65) Prior Publication Data
US 2024/0190293 A1 Jun. 13, 2024

(51) Int. Cl.
| | |
|---|---|
| B60L 58/19 | (2019.01) |
| H01M 10/44 | (2006.01) |
| H02J 7/00 | (2006.01) |
| H02M 3/158 | (2006.01) |

(52) U.S. Cl.
CPC ........... *B60L 58/19* (2019.02); *H01M 10/441* (2013.01); *H02J 7/0024* (2013.01); *H02M 3/1582* (2013.01); *H01M 2220/20* (2013.01)

(58) Field of Classification Search
CPC .. B60L 58/19; B60L 2210/14; B60L 2210/10; B60L 2210/30; B60L 2210/40; B60L 53/24; B60L 15/007; B60L 2240/547; B60L 53/11; B60L 50/60; B60L 2240/527; B60L 58/12; B60L 50/16; B60L 55/00; B60L 50/61; B60L 53/53; H01M 10/441; H01M 2220/20; H02J 7/0024; H02J 2207/20; H02J 7/02; H02J 2310/48; H02J 7/0013; H02J 7/1423; H02J 7/0063; H02J 1/082; H02J 7/007; H02J 1/10; H02M 3/1582; Y02T 10/72; Y02T 90/12; Y02T 10/92; Y02T 10/64; Y02T 10/62; Y02T 90/14; Y02T 10/7072; Y02T 10/70
USPC ............... 323/109, 107, 104, 137, 116, 158; 363/65, 131; 307/10.7, 9.1, 10.1, 82, 43, 307/46, 77, 18; 903/904, 907, 903, 930
See application file for complete search history.

(56) References Cited

U.S. PATENT DOCUMENTS

2008/0074911 A1* 3/2008 Petter .................. H02M 3/1584
363/65
2022/0416551 A1* 12/2022 Tsubaki ............... G01R 31/385

* cited by examiner

*Primary Examiner* — Elim Ortiz
(74) *Attorney, Agent, or Firm* — CANTOR COLBURN LLP

(57) ABSTRACT

An electric drive system for an electric vehicle is provided. The electric drive system includes a first electric drive, a second electric drive, and a switchable battery including at least two battery packs that are selectively arranged in one of a series configuration and a parallel configuration. The electric drive system also includes a first half-bridge buck converter connecting the first electric drive to a first battery back of the at least two battery packs of the switchable battery and a second half-bridge buck converter connecting the second electric drive to a second battery back of the at least two battery packs of the switchable battery. The electric drive system further includes a controller configured to control the configuration of the switchable battery, an operation of the first half-bridge buck converter, and the second half-bridge buck converter.

20 Claims, 8 Drawing Sheets

ELECTRIC DRIVE WITH DUAL-ENERGY STORAGE AND VARIABLE INVERTER INPUT

INTRODUCTION

The disclosure relates to electric vehicles, and more particularly to power control systems for controlling battery configuration during driving.

Electric vehicles (EVs) such as battery electric vehicles (BEVs), hybrid vehicles, and/or fuel cell vehicles include one or more electric machines and a battery system. The battery system includes one or more battery cells, modules and/or packs that are connected in series and/or parallel. A power control system is used to control charging and/or discharging of the battery system during charging and/or driving. During use, the electric machine is operated as a motor for propulsion and as a generator for regeneration during braking. The power control system includes a power inverter module that is arranged between the battery system and the electric machine.

SUMMARY

In one exemplary embodiment, a method for electric drive system is provided. The electric drive system includes a first electric drive, a second electric drive, and a switchable battery including at least two battery packs that are selectively arranged in one of a series configuration and a parallel configuration. The electric drive system also includes a first half-bridge buck converter connecting the first electric drive to a first battery back of the at least two battery packs of the switchable battery and a second half-bridge buck converter connecting the second electric drive to a second battery back of the at least two battery packs of the switchable battery. The electric drive system further includes a controller configured to control the configuration of the switchable battery, an operation of the first half-bridge buck converter, and the second half-bridge buck converter.

In addition to the one or more features described herein the electric drive system further includes a first saturable inductor disposed between the first half-bridge buck converter and the first electric drive and a second saturable inductor disposed between the second half-bridge buck converter and the second electric drive.

In addition to the one or more features described herein the controller is configured to operate the electric drive system in one of a first operating mode, a second operating mode and a third operating mode.

In addition to the one or more features described herein the first operating mode includes configuring the at least two battery packs in parallel and clamping the first half-bridge buck converter and the second half-bridge buck converter.

In addition to the one or more features described herein the second operating mode includes configuring the at least two battery packs in series and controlling a duty cycle of the first half-bridge buck converter and the second half-bridge buck converter to adjust a voltage to provide the first electric drive and the second electric drive respectively.

In addition to the one or more features described herein the duty cycle of the first half-bridge buck converter and the duty cycle of the second half-bridge buck converter are controlled individually to provide different voltages to the first electric drive and the second electric drive.

In addition to the one or more features described herein the third operating mode includes configuring the at least two battery packs in series and one of clamping a portion of the first half-bridge buck converter and the second half-bridge buck converter.

In addition to the one or more features described herein the third operating mode includes configuring the at least two battery packs in series and one of clamping a portion of the first half-bridge buck converter and the second half-bridge buck converter and bypassing the first half-bridge buck converter and the second half-bridge buck converter.

In addition to the one or more features described herein wherein the controller is configured to determine an operating mode of the electric drive system based at least in part on a rotational speed of one or more of the first electric drive and the second electric drive.

In addition to the one or more features described herein wherein the controller is configured to only transition between the first operating mode and the second operating mode and between the second operating mode and the third operating mode.

In addition to the one or more features described herein wherein the controller is configured to operate in the third operating mode based on a determination that the rotational speed of one or more of the first electric drive and the second electric drive is above a threshold level.

In one exemplary embodiment, an electric vehicle is provided. The electric vehicle includes an electric drive system having a first electric drive, a second electric drive, and a switchable battery including at least two battery packs that are selectively arranged in one of a series configuration and a parallel configuration. The electric drive system also includes a first half-bridge buck converter connecting the first electric drive to a first battery back of the at least two battery packs of the switchable battery and a second half-bridge buck converter connecting the second electric drive to a second battery back of the at least two battery packs of the switchable battery. The electric drive system further includes a controller configured to control the configuration of the switchable battery, an operation of the first half-bridge buck converter, and the second half-bridge buck converter.

In addition to the one or more features described herein the electric drive system further includes a first saturable inductor disposed between the first half-bridge buck converter and the first electric drive and a second saturable inductor disposed between the second half-bridge buck converter and the second electric drive.

In addition to the one or more features described herein the controller is configured to operate the electric drive system in one of a first operating mode, a second operating mode and a third operating mode.

In addition to the one or more features described herein the first operating mode includes configuring the at least two battery packs in parallel and clamping the first half-bridge buck converter and the second half-bridge buck converter.

In addition to the one or more features described herein the second operating mode includes configuring the at least two battery packs in series and controlling a duty cycle of the first half-bridge buck converter and the second half-bridge buck converter to adjust a voltage to provide the first electric drive and the second electric drive respectively.

In addition to the one or more features described herein the duty cycle of the first half-bridge buck converter and the duty cycle of the second half-bridge buck converter are controlled individually to provide different voltages to the first electric drive and the second electric drive.

In addition to the one or more features described herein the third operating mode includes configuring the at least two battery packs in series and one of clamping a portion of the first half-bridge buck converter and the second half-bridge buck converter.

In addition to the one or more features described herein the third operating mode includes configuring the at least two battery packs in series and one of clamping a portion of the first half-bridge buck converter and the second half-bridge buck converter and bypassing the first half-bridge buck converter and the second half-bridge buck converter.

In addition to the one or more features described herein wherein the controller is configured to determine the operating mode of the electric drive system based at least in part on a rotational speed of one or more of the first electric drive and the second electric drive.

In addition to the one or more features described herein wherein the controller is configured to only transition between the first operating mode and the second operating mode and between the second operating mode and the third operating mode.

In one exemplary embodiment, a method for electric drive system is provided. The electric drive system includes a first electric drive, a second electric drive, and a switchable battery including at least two battery packs that are selectively arranged in one of a series configuration and a parallel configuration. The electric drive system also includes a first half-bridge buck converter connecting the first electric drive to a first battery back of the at least two battery packs of the switchable battery and a second half-bridge buck converter connecting the second electric drive to a second battery back of the at least two battery packs of the switchable battery. The electric drive system further includes a controller configured to control the configuration of the switchable battery, an operation of the first half-bridge buck converter, and the second half-bridge buck converter. The controller configures the at least two battery packs in parallel based at least in part on a rotational speed of one or more of the first electric drive and the second electric drive being below a first threshold level and configures the at least two battery packs in series based at least in part on a rotational speed of one or more of the first electric drive and the second electric drive being above a second threshold level.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Electric vehicles (EVs) such as battery electric vehicles (BEVs), hybrid vehicles, and/or fuel cell vehicles include one or more electric machines and a battery system. A power control system is used to control charging and/or discharging of the battery system. The power control system includes one or more power converter and inverter modules that are arranged between the battery system and the one or more electric machines.

In exemplary embodiments, the battery system includes a switchable battery that includes multiple battery packs that are capable of being selectively connected in parallel and operated at a first voltage level. The multiple battery packs can also be selectively connected in series and operate at a second voltage level that is greater than the first voltage level. A power control system can be used to control the switching between the two or more configurations during driving depending upon the operating conditions of the EV. In addition, the power control system is configured to selectively tune the second voltage level between a minimum and maximum voltage.

In general, the efficiency of an electric vehicle can be improved by selecting the most efficient voltage level for the operating conditions. In some examples, the operating conditions that are used to select the desired voltage level include operating configuration (motoring or regeneration), torque, and speed, although other operating conditions can be used. For example, the efficiency of an electric drive can be improved by operating at the minimum allowable voltage for the operating conditions. Higher voltage levels unlock performance and increase efficiency at certain operating points that cannot otherwise be achieved.

The power control system according to the present disclosure reconfigures the connection between two battery packs of the switchable battery and controls the operation of DC-DC converters, which are used to connect the switchable battery to the drives, to operate at the drives at different voltage levels during driving. For example, when the battery packs are connected in parallel, the switchable battery supplies a first voltage level to each drive. When the battery packs are connected in series, the switchable battery pack supplies a second voltage level, which is greater than the first voltage level. In exemplary embodiments, the second voltage level is selectively controlled by controlling the operation of DC-DC converters, that are used to connect the switchable battery to the drives. In one embodiment, the second voltage level has a maximum value that is twice the first voltage level.

Figure 1:
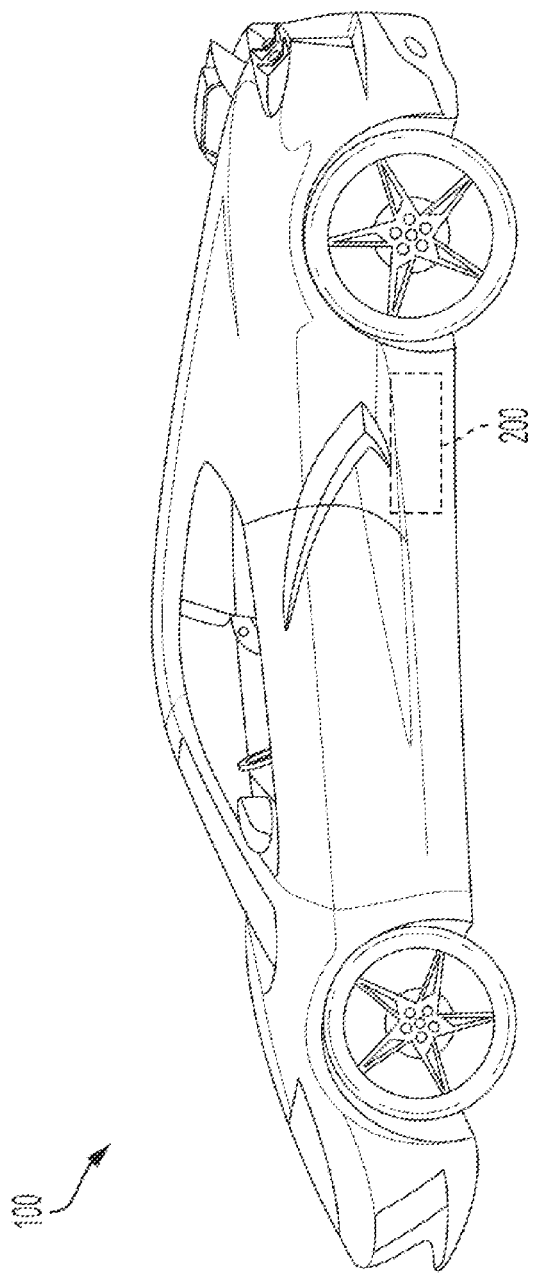
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes an electric drive system 200. In one embodiment, the vehicle 100 is a hybrid vehicle that utilizes both an internal combustion engine and an electric motor powered by the electric drive system 200. In another embodiment, the vehicle 100 is an electric vehicle that only utilizes electric motors that are powered by the electric drive system 200.

Figure 2:
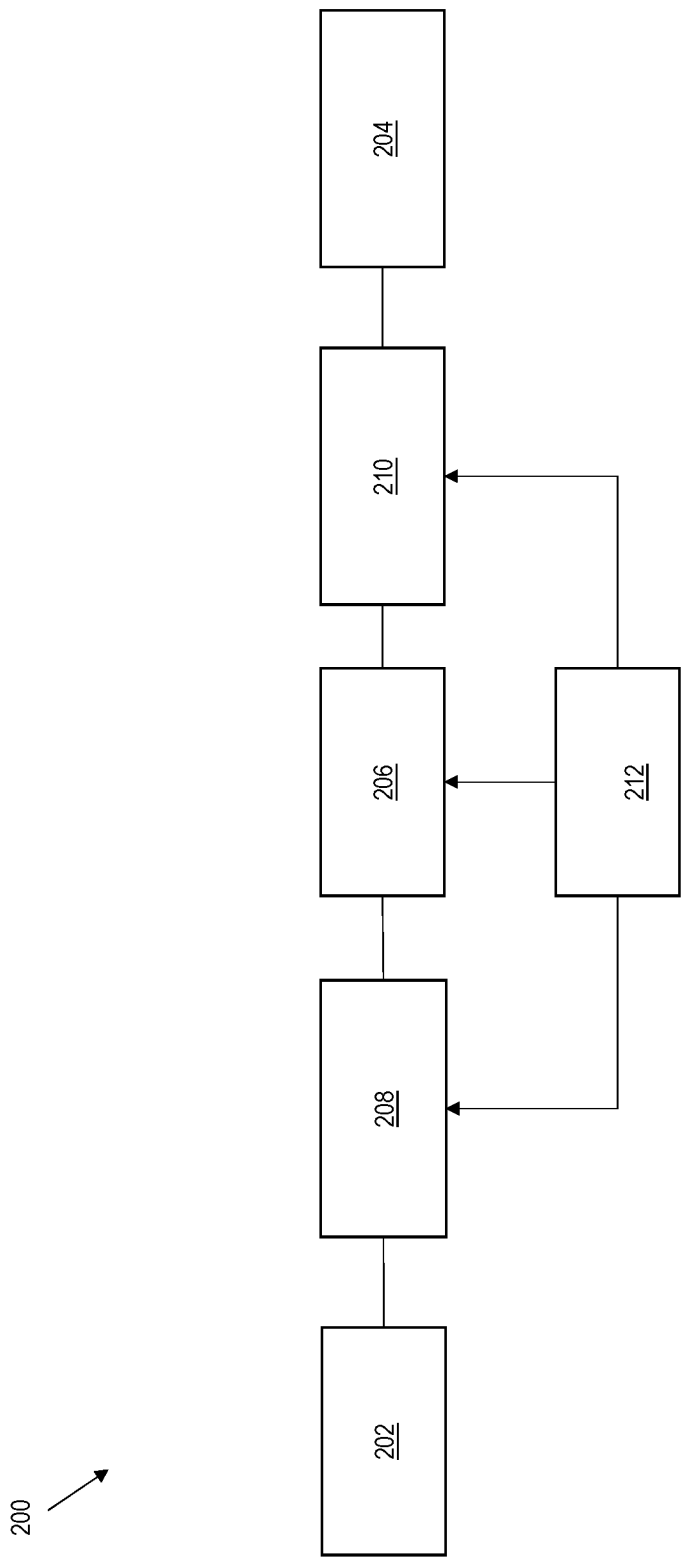
FIG. 2 is a block diagram illustrating an electric drive system of a vehicle in accordance with an exemplary embodiment.

FIG. 2 is a block diagram illustrating an electric drive system 200 for a vehicle in accordance with an exemplary embodiment is shown. The electric drive system 200 includes a first electric drive 202, a second electric drive 204, and a switchable battery 206. The switchable battery 206 includes multiple battery packs that are capable of being selectively connected in series or parallel. In exemplary embodiments, the electric drive system 200 includes a controller 212 that is configured to control the configuration of the switchable battery 206.

The electric drive system 200 also includes a first DC-DC converter 208, such as a half-bridge buck converter, that is configured to connect the switchable battery 206 to the first electric drive 202. The electric drive system 200 further includes a second DC-DC converter 210, such as a half-bridge buck converter, that is configured to connect the switchable battery 206 to the second electric drive 204. In exemplary embodiments, the controller 212 is configured to control the operation of the first DC-DC converter 208 and the second DC-DC converter 210. In exemplary embodiments, the DC-DC converters are connected across one of the battery packs instead of across the entire series configuration of the switchable battery 206.

In exemplary embodiments, the controller 212 is configured to independently control a first voltage supplied to the first electric drive 202 and a second voltage supplied to the second electric drive 204 by controlling a configuration (i.e., series or parallel) of the switchable battery 206 and by controlling a duty cycle of the first DC-DC converter 208 and the second DC-DC converter 210. In one embodiment, the switchable battery 206 includes two four-hundred-volt batteries, and the voltages supplied to the first electric drive 202 and the second electric drive are between four hundred volts and eight hundred volts. In exemplary embodiments, the controller 212 is configured to determine the voltage to be supplied to an electric drive based on a desired rotational speed of the electric drive.

Figure 3:
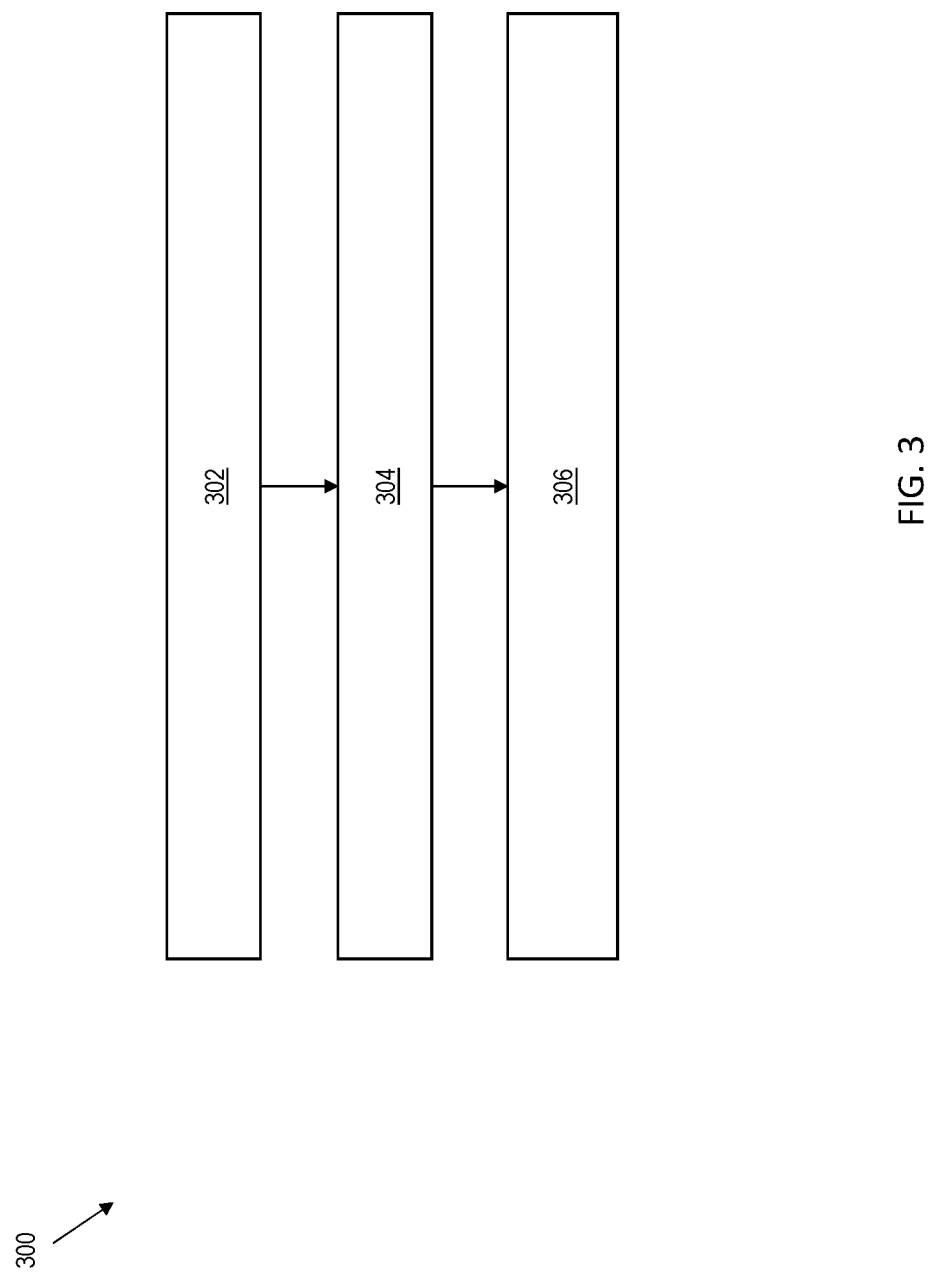
FIG. 3 is a flowchart illustrating a method for controlling an electric drive system of a vehicle in accordance with an exemplary embodiment.

Referring now to FIG. 3 a flowchart illustrating a method 300 for controlling an electric drive system of a vehicle in accordance with an exemplary embodiment is shown. At block 302, the method 300 includes detecting an operating condition of an electric vehicle. In exemplary embodiments, the operating condition of an electric vehicle may include the speed of travel of the electric vehicle, a rotational speed of an electric drive of the electric vehicle, or the like. In exemplary embodiments, one or more sensors are disposed within the vehicle and are configured to provide data to a controller of the vehicle, which uses the sensed data to determine the operating condition of the electric vehicle.

Next, at block 304, the method 300 includes determining an optimal configuration of the electric drive system of the vehicle based on the operating condition. In exemplary embodiments, a controller is configured to determine the operating condition of the vehicle and select an operating configuration of the electric drive system from a plurality of available operating configurations based on an expected efficiency associated with the operating condition. As discussed briefly herein, in general, the efficiency of an electric vehicle can be improved by selecting the most efficient voltage level for the operating conditions. For example, the efficiency of an electric drive can be improved by operating at the minimum allowable voltage for the operating conditions. In one example, based on the operating condition indicating that the vehicle is operating at a low speed, (i.e., less than 35 miles per hour), the optimal configuration of the electric drive system can be selected as providing the lowest possible voltage to the electric drives.

Once the optimal configuration of the electric drive system of the vehicle has been determined, at block 306 the method 300 includes configuring a switchable battery and one or more DC-DC converters of the vehicle based on the optimal configuration. In exemplary embodiments, the various configurations of the electric drive system determine what voltage(s) can be supplied to the electric drives. The various configurations of the electric drive system will be described in more detail with reference to FIGS. 4B-4E.

Figure 4A:
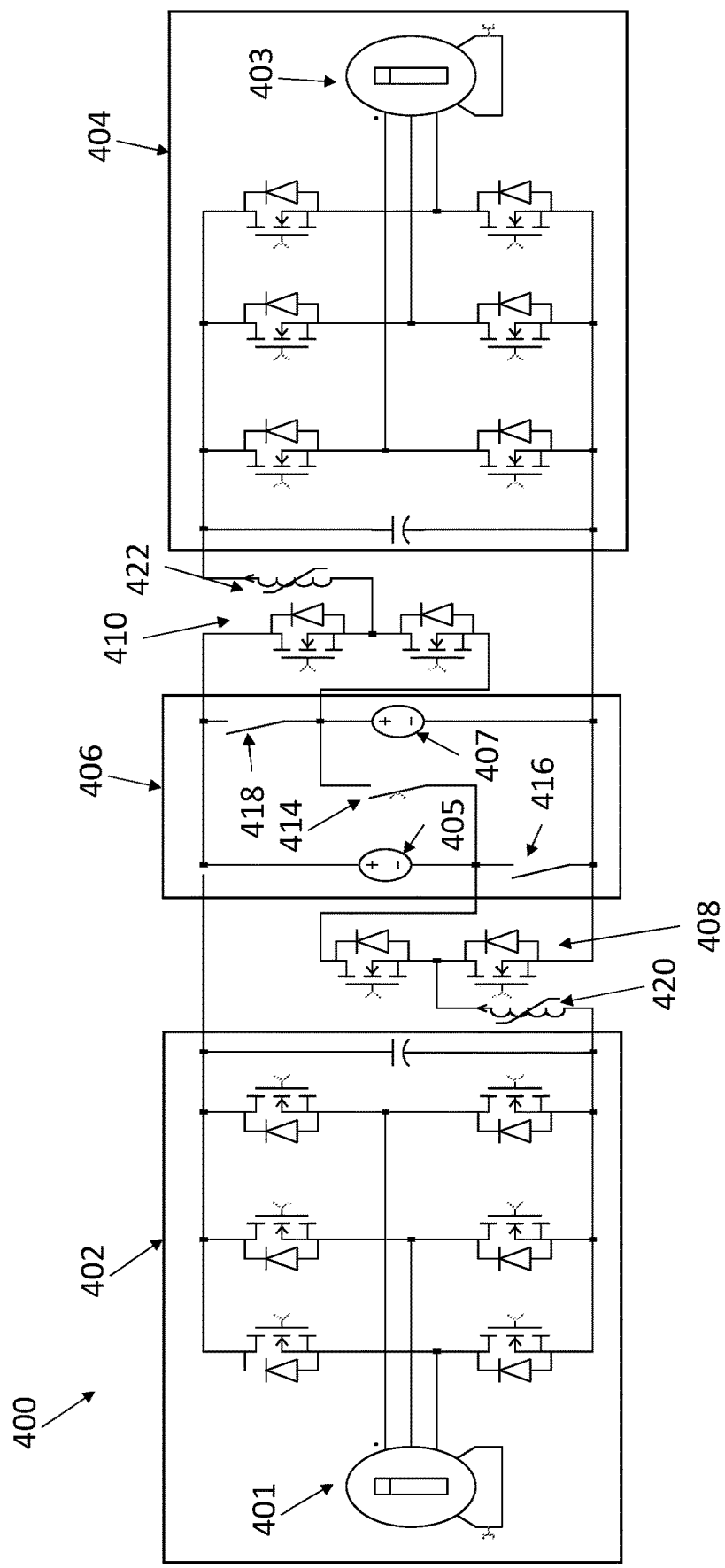
FIG. 4A is a schematic illustrating a portion of an electric drive system of a vehicle in accordance with an exemplary embodiment.

Referring now to FIG. 4A a schematic illustrating a portion of an electric drive system 400 for a vehicle in accordance with an exemplary embodiment is shown. As illustrated, the electric drive system 400 includes a first electric drive 402, a second electric drive 404, and a switchable battery 406. The first electric drive 402 includes a first motor 401 and an inverter and the second electric drive 404 includes a second motor 403 and an inverter. The switchable battery 406 includes a first battery 405 and a second battery 407 that are capable of being selectively connected in series or parallel based on the state of switches 414, 416, and 418. Although illustrated as single batteries 405, 407, it will be appreciated by those of ordinary skill in the art that batteries 405, 407 can include battery packs that include a plurality of battery cells.

In exemplary embodiments, the electric drive system 400 also includes a first half-bridge buck converter 408 that is configured to electrically connect the first battery 405 of the switchable battery 406 to the first electric drive 402. The electric drive system 400 also includes a second half-bridge buck converter 410 that is configured to electrically connect the second battery 407 of the switchable battery 406 to the second electric drive 404. In one embodiment, a first saturable inductor 420 is connected between the first half-bridge buck converter 408 and the first electric drive 402. In one embodiment, a second saturable inductor 422 is connected between the second half-bridge buck converter 410 and the second electric drive 404. The saturable inductors 420, 422 are inductors that have a magnetic core that can be saturated by a direct electric current in a control winding. Once saturated, the inductance of the saturable inductors 420, 422 drops significantly and allows increased flow of the current and change of current.

In exemplary embodiments, the electric drive system 400 includes a controller (not shown) that is configured to control the configuration of the state of switches 414, 416, and 418 and to control a duty cycle of the first half-bridge buck converter 408 and the second half-bridge buck converter 410. In exemplary embodiments, the controller is able to independently control a voltage that is supplied to the first electric drive 402 and the second electric drive 404 by controlling the state of switches 414, 416, and 418 and to control a duty cycle of the first half-bridge buck converter 408 and the second half-bridge buck converter 410. In one embodiment, the voltage that can be supplied to the first electric drive 402 and the second electric drive 404 ranges from the voltage of battery 405, 407 to the combined voltage of the batteries 405, 407. For example, the voltage can range from four hundred volts to eight hundred volts if both battery 405 and battery 407 are four hundred volt batteries. When the first battery 405 and the second battery 407 are in parallel the voltage will be four hundred volts, when in series the voltage will depend on the duty cycle of half bridge converter across each of the two batteries and the voltage will be between four hundred volts to eight hundred volts.

Figure 4B:
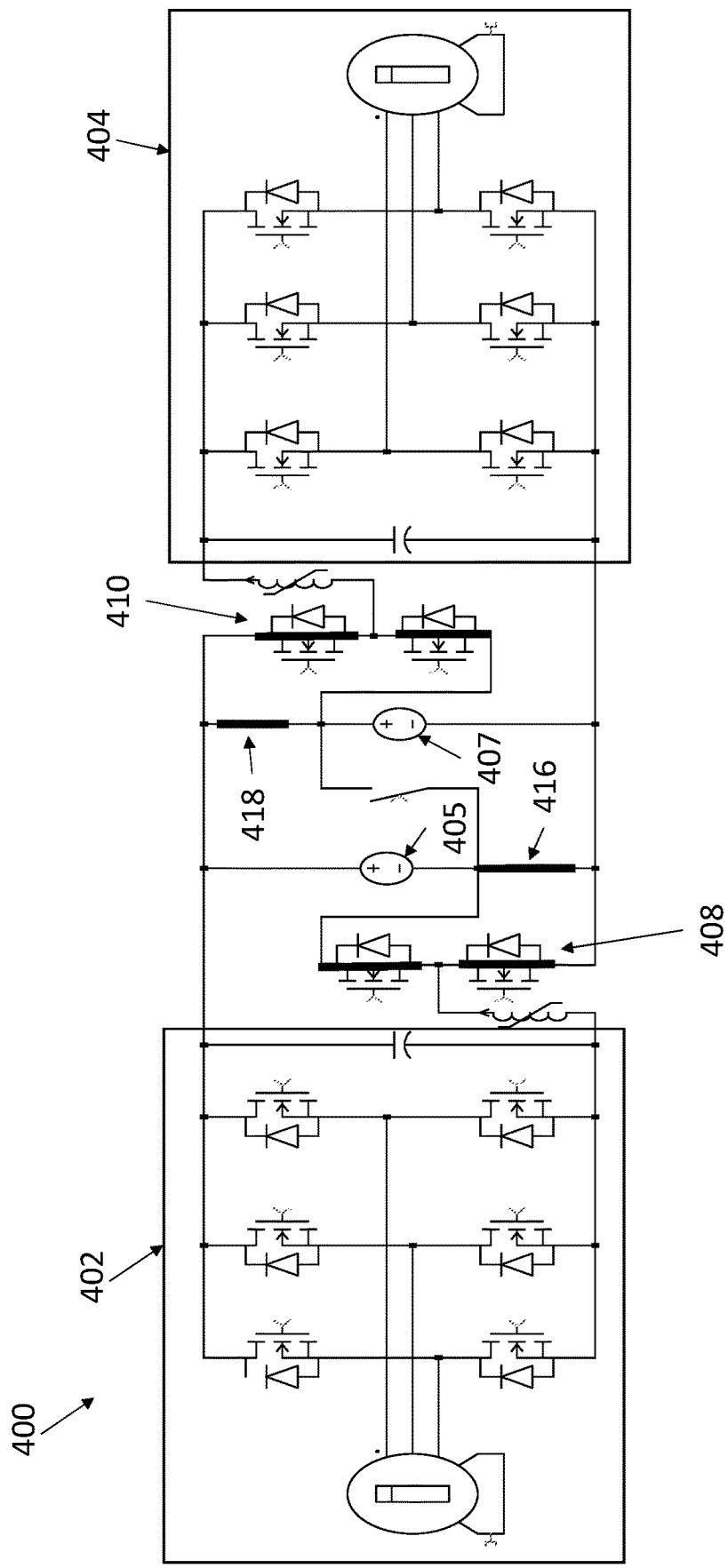
FIG. 4B is a schematic illustrating a portion of an electric drive system in a first configuration of a vehicle in accordance with an exemplary embodiment.

Referring now to FIG. 4B a schematic illustrating a portion of an electric drive system 400 in a first configuration for a vehicle in accordance with an exemplary embodiment is shown. In the first configuration of the electric drive system, switch 414 is open and switches 416 and 418 are closed, which results in battery 405 and battery 407 being connected in parallel. In addition, a duty cycle of the first half-bridge buck converter 408 and the second half-bridge buck converter 410 are set to one hundred percent on one or both switches, (i.e., the half-bridge buck converters are clamped). In the first configuration, the electric drive system 400 supplies equal voltages to both the first electric drive 402 and the second electric drive 404. The voltage supplied to the first electric drive 402 and the second electric drive 404 is the voltage of the battery 405 and battery 407, which are configured to be substantially equal.

In exemplary embodiments, the first configuration of the electric drive system shown in FIG. 4B corresponds to a first operating mode of the electric drive system. In exemplary embodiments, based on a determination that a vehicle is being operated at a speed less than a first threshold level, a controller of the electric drive system operates the electric drive system in a first operating mode by configuring the electric drive system in the first configuration.

Figure 4C:
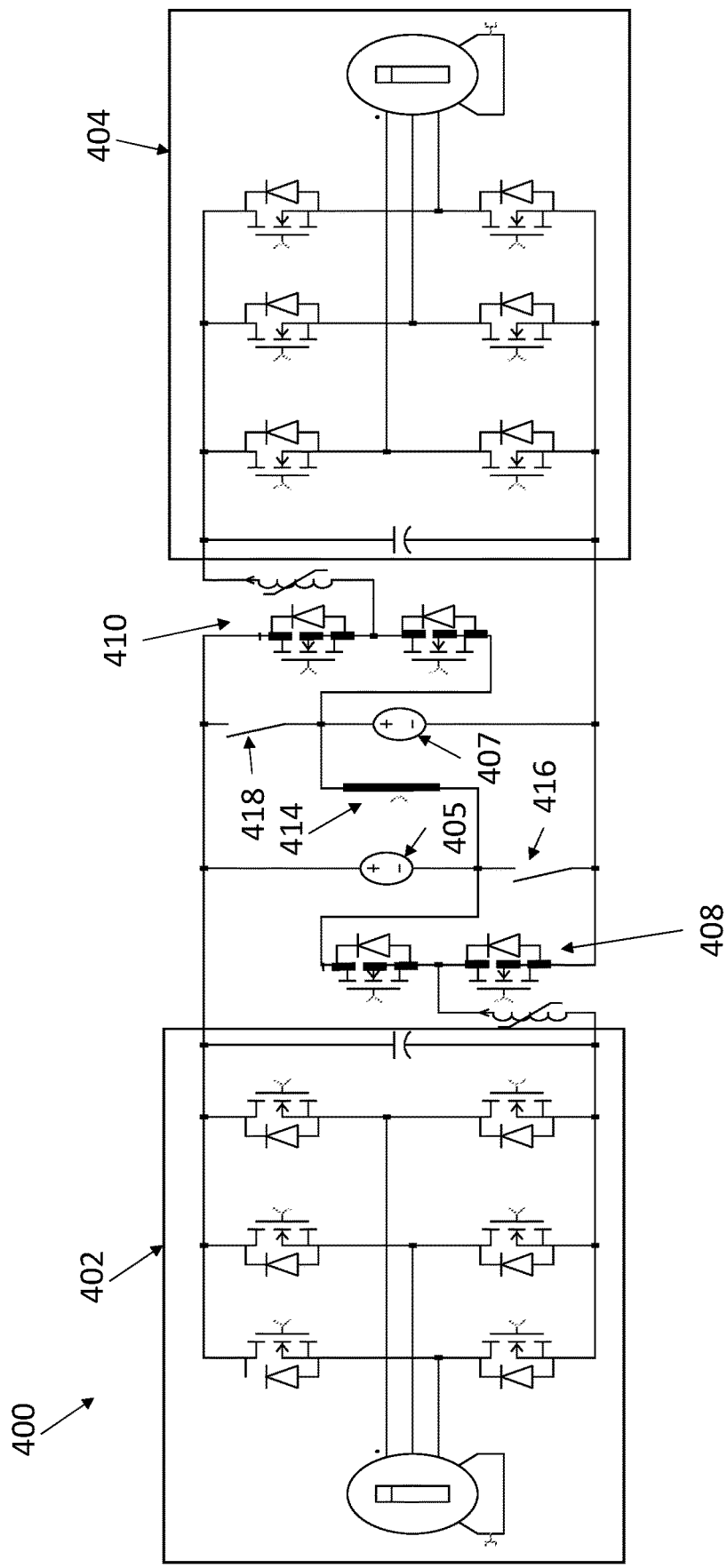
FIG. 4C is a schematic illustrating a portion of an electric drive system in a second configuration of a vehicle in accordance with an exemplary embodiment.

Referring now to FIG. 4C a schematic illustrating a portion of an electric drive system 400 in a second configuration for a vehicle in accordance with an exemplary embodiment is shown. In the second configuration of the electric drive system, switch 414 is closed and switches 416 and 418 are open, which results in battery 405 and battery 407 being connected in series. The duty cycle of the first half-bridge buck converter 408 is adjusted to control a voltage supplied to the first electric drive 402 and the duty cycle of the second half-bridge buck converter 410 is adjusted to control a voltage supplied to the second electric drive 404. In exemplary embodiments, the voltages supplied to the first electric drive 402 and the second electric drive 404 range from the voltage of battery 405, 407 to the combined voltage of the batteries 405, 407. For example, the voltage can range from four hundred volts to eight hundred volts if both battery 405 and battery 407 are four hundred volt batteries. In the second configuration, the electric drive system 400 can be configured to supply different or equal voltages to the first electric drive 402 and to the second electric drive 404 based on the duty cycle of the respective half-bridge buck converters. The independent voltage control is due to the fact that the voltage delivered to an electric drive is the sum of voltage from one battery pack and stepped down voltage from the second battery pack. This partial voltage processing is due to arrangement of different half bridge buck converters across different batteries of the battery pack.

In exemplary embodiments, the second configuration of the electric drive system shown in FIG. 4C corresponds to a second operating mode of the electric drive system. In exemplary embodiments, based on a determination that a vehicle is being operated at a speed greater than a first threshold level and less than a second threshold level, a controller of the electric drive system operates the electric drive system in a second operating mode by configuring the electric drive system in the second configuration.

Figure 4D:
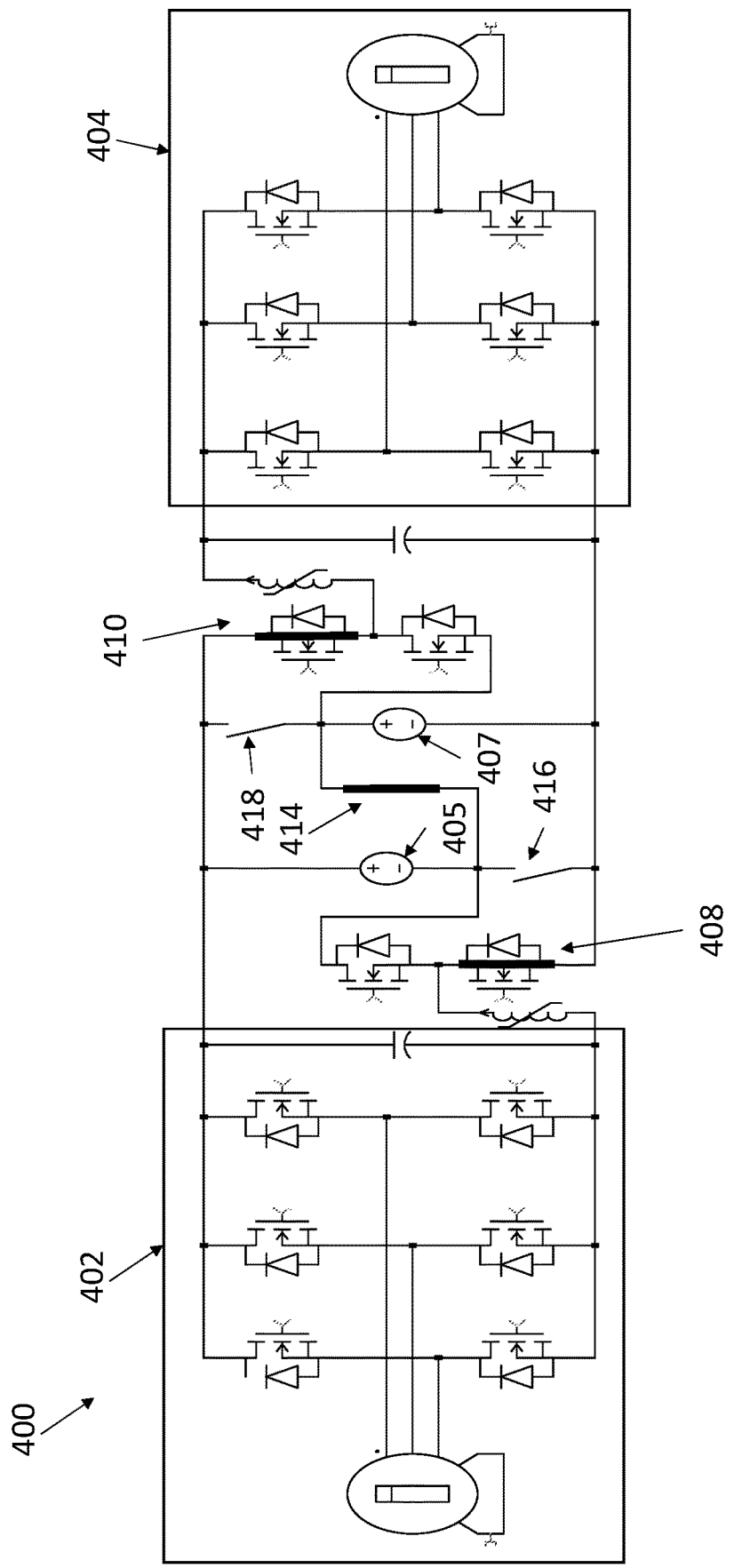
FIG. 4D is a schematic illustrating a portion of an electric drive system in a third configuration a third configuration of a vehicle in accordance with an exemplary embodiment.

Referring now to FIG. 4D a schematic illustrating a portion of an electric drive system 400 in a third configuration for a vehicle in accordance with an exemplary embodiment is shown. In the third configuration of the electric drive system, switch 414 is closed and switches 416 and 418 are open, which results in battery 405 and battery 407 being connected in series. In addition, the duty cycle of one side of the first half-bridge buck converter 408 and one side of the second half-bridge buck converter 410 are set to one hundred percent, (i.e., clamped) and the duty cycle of the opposite side of the first half-bridge buck converter 408 and the opposite side of the second half-bridge buck converter 410 are set to zero percent. In the third configuration, the electric drive system 400 supplies equal voltages to both the first electric drive 402 and the second electric drive 404. The voltage supplied to the first electric drive 402 and the second electric drive 404 are the combined voltages of the battery 405 and battery 407. For example, the supplied voltage will be approximately eight hundred volts if both battery 405 and battery 407 are four hundred volt batteries.

In exemplary embodiments, the third configuration of the electric drive system shown in FIG. 4D corresponds to a third operating mode of the electric drive system. In exemplary embodiments, based on a determination that a vehicle is being operated at a speed greater than a second threshold level, a controller of the electric drive system operates the electric drive system in a third operating mode by configuring the electric drive system in the third configuration.

Figure 4E:
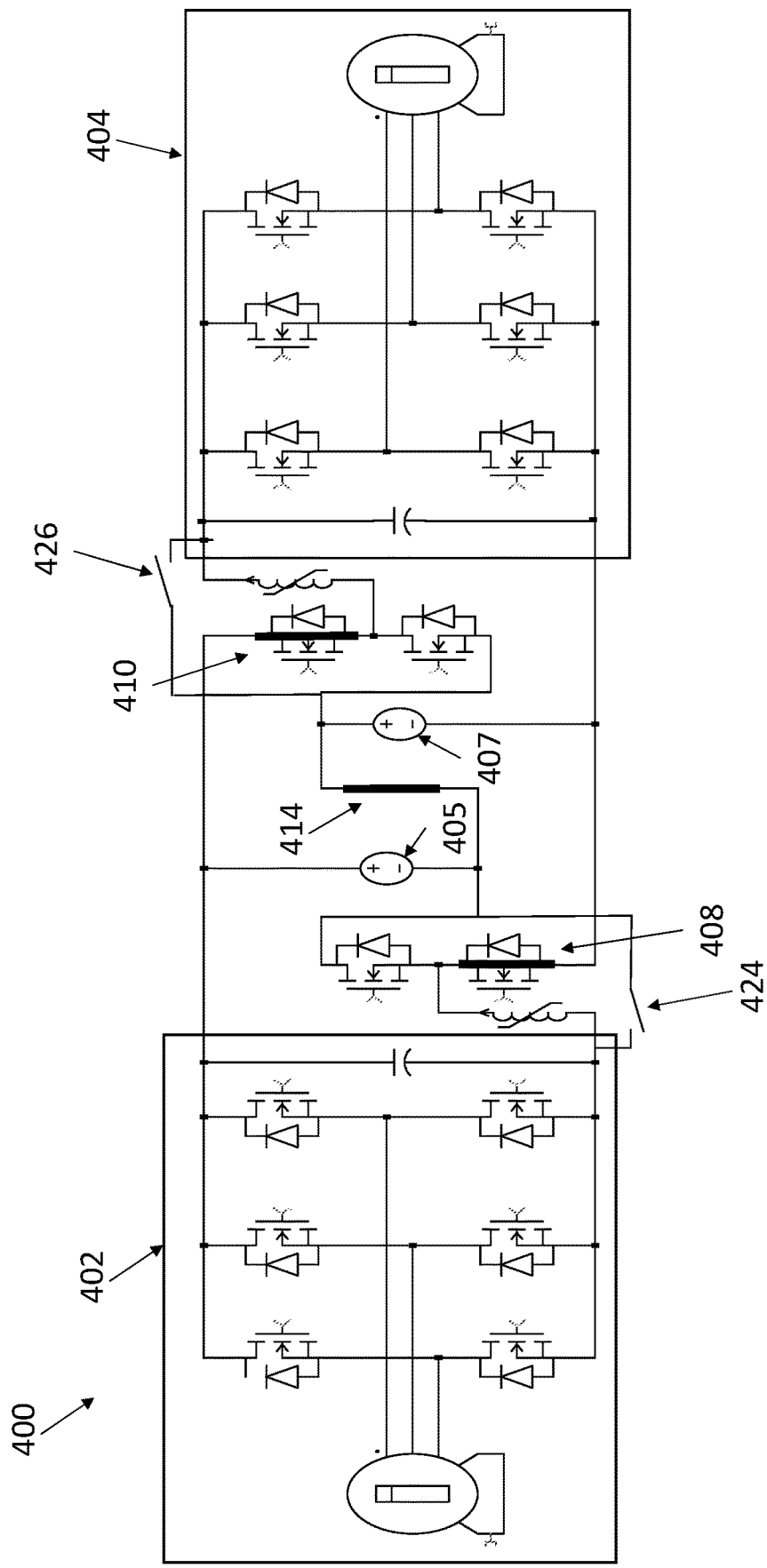
FIG. 4E is a schematic illustrating a portion of an electric drive system in a fourth configuration for a vehicle in accordance with an exemplary embodiment.

Referring now to FIG. 4E a schematic illustrating a portion of an electric drive system 400 in a fourth configuration for a vehicle in accordance with an exemplary embodiment is shown. In the fourth configuration of the electric drive system, switch 414 is closed, which results in battery 405 and battery 407 being connected in series. In addition, when switches 424 and 426 are configured in a closed position, the first half-bridge buck converter 408 and the second half-bridge buck converter 410 are effectively bypassed. In the fourth configuration, the electric drive system 400 supplies equal voltages to both the first electric drive 402 and the second electric drive 404. The voltage supplied to the first electric drive 402 and to the second electric drive 404 are the combined voltages of the battery 405 and battery 407. For example, the supplied voltage will be approximately eight hundred volts if both battery 405 and battery 407 are four hundred volt batteries.

In exemplary embodiments, the fourth configuration of the electric drive system shown in FIG. 4E corresponds to a third operating mode of the electric drive system. In exemplary embodiments, based on a determination that a vehicle is being operated at a speed greater than the second threshold level, a controller of the electric drive system operates the electric drive system in a third operating mode by configuring the electric drive system in the fourth configuration.

In exemplary embodiments, the third configuration of the electric drive system shown in FIG. 4D and the fourth configuration of the electric drive system shown in FIG. 4E are both configured to provide the combined voltages of the battery 405 and battery 407 to the first electric drive 402 and the second electric drive 404. The fourth configuration shown in FIG. 4E utilizes switches 424, 426 to bypass the half-bridge buck converters 408, 410 and avoids the energy losses associated with the half-bridge buck converters. In an alternative configuration of electric drive system, which is similar the configuration shown in FIG. 4E, the electric drive system does not include the switches 424, 426 but rather operates the converters 408, 410 at a one hundred percent duty cycle to maximize current flow to the motors.

In one embodiment, a controller of an electric drive system of the vehicle is configured to operate the electric drive system in the first operating mode based until the speed of the vehicle, or the rotational speed of an electric motor of the vehicle, exceeds a first threshold value. Once the speed of the vehicle, or the rotational speed of an electric motor of the vehicle, exceeds the first threshold value, the controller is configured to operate the electric drive system in the second operating mode until the speed of the vehicle, or the rotational speed of an electric motor of the vehicle, exceeds a second threshold value, which is greater than the first threshold value. One the speed of the vehicle, or the rotational speed of an electric motor of the vehicle, exceeds the second threshold value, the controller is configured to operate the electric drive system in the third operating mode. Likewise, the controller is configured to change the operating modes as the speed of the vehicle decreases and transitions across the second and first threshold values.

In another embodiment, a controller of an electric drive system of the vehicle is configured to operate the electric drive system in the first operating mode based until the speed of the vehicle, or the rotational speed of an electric motor of the vehicle, exceeds a first threshold value. Once the speed of the vehicle, or the rotational speed of an electric motor of the vehicle, exceeds the first threshold value, the controller is configured to operate the electric drive system in the second operating mode for a fixed period of time (i.e., a transitional period) and then to operate the electric drive system in the third operating mode. Likewise, the controller is configured to change the operating mode of the electric drive system from the third operating mode to the first operating mode as the speed of the vehicle decreases and transitions across the first threshold value. In this embodiment, the duty cycle of the half-bridge buck convertors is ramped up/down during the transitional period.

In exemplary embodiments, by using the second configuration of the electric drive system to transition between a low voltage mode (i.e., the first operating mode) and a high voltage mode (i.e., the third operating mode) potential damage to the electric drives can be avoided by ramping up/down the increase in the voltage level in a controlled manner.

Although a desired rotational speed of the electric drive is primarily discussed above to be a variable that is used to configured to determine the voltage to be supplied to an electric drive based, it will be appreciated by those of ordinary skill in the art that other variable and inputs can be used to determine the voltage to be supplied to an electric drive. Other such variable and inputs include, but are not limited to, a torque level of the electric drive, a driver selected performance mode, a route prediction, a temperature of the electric drives, and the like.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric drive system comprising:
    a first electric drive;
    a second electric drive;
    a switchable battery including at least two battery packs that are selectively arranged in one of a series configuration and a parallel configuration;
    a first half-bridge buck converter connecting the first electric drive to a first battery back of the at least two battery packs of the switchable battery;
    a second half-bridge buck converter connecting the second electric drive to a second battery back of the at least two battery packs of the switchable battery; and
    a controller configured to control a configuration of the switchable battery, an operation of the first half-bridge buck converter, and the second half-bridge buck converter,
    wherein the controller is configured to operate the electric drive system in one of a first operating mode, a second operating mode and a third operating mode, wherein each of the operating modes define a different configuration arrangement of the switchable battery, an operation of the first half-bridge buck converter, and the second half-bridge buck converter.

2. The electric drive system of claim 1, further comprising a first saturable inductor disposed between the switchable battery and the first electric drive and a second saturable inductor disposed between the switchable battery and the second electric drive.

3. The electric drive system of claim 1, wherein, the first operating mode includes configuring the at least two battery packs in parallel and clamping the first half-bridge buck converter and the second half-bridge buck converter.

4. The electric drive system of claim 1, wherein the second operating mode includes configuring the at least two battery packs in series and controlling a duty cycle of the first half-bridge buck converter and the second half-bridge buck converter to adjust a voltage to provide the first electric drive and the second electric drive respectively.

5. The electric drive system of claim 4, wherein the duty cycle of the first half-bridge buck converter and the duty cycle of the second half-bridge buck converter are controlled individually to provide different voltages to the first electric drive and the second electric drive.

6. The electric drive system of claim 1, wherein the third operating mode includes configuring the at least two battery packs in series and one of clamping a portion of the first half-bridge buck converter and the second half-bridge buck converter.

7. The electric drive system of claim 1, wherein the third operating mode includes configuring the at least two battery packs in series and one of clamping a portion of the first half-bridge buck converter and the second half-bridge buck converter and bypassing the first half-bridge buck converter and the second half-bridge buck converter.

8. The electric drive system of claim 1, wherein the controller is configured to determine an operating mode of the electric drive system based at least in part on a rotational speed of one or more of the first electric drive and the second electric drive.

9. The electric drive system of claim 8, wherein the controller is configured to only transition between the first operating mode and the second operating mode and between the second operating mode and the third operating mode.

10. The electric drive system of claim 8, wherein the controller is configured to operate in the third operating mode based on a determination that the rotational speed of one or more of the first electric drive and the second electric drive is above a threshold level.

11. An electric vehicle comprising:
an electric drive system comprising:
a first electric drive;
a second electric drive;
a switchable battery including at least two battery packs that are selectively arranged in one of a series configuration and a parallel configuration;
a first half-bridge buck converter connecting the first electric drive to a first battery back of the at least two battery packs of the switchable battery;
a second half-bridge buck converter connecting the second electric drive to a second battery back of the at least two battery packs of the switchable battery; and
a controller configured to control a configuration of the switchable battery, an operation of the first half-bridge buck converter, and the second half-bridge buck converter,
wherein the controller is configured to operate the electric drive system in one of a first operating mode, a second operating mode and a third operating mode, wherein each of the operating modes define a different configuration arrangement of the switchable battery, an operation of the first half-bridge buck converter, and the second half-bridge buck converter.

12. The electric vehicle of claim 11, further comprising a first saturable inductor disposed between the switchable battery and the first electric drive and a second saturable inductor disposed between the switchable battery and the second electric drive.

13. The electric vehicle of claim 12, wherein, the first operating mode includes configuring the at least two battery packs in parallel and clamping the first half-bridge buck converter and the second half-bridge buck converter.

14. The electric vehicle of claim 12, wherein the second operating mode includes configuring the at least two battery packs in series and controlling a duty cycle of the first half-bridge buck converter and the second half-bridge buck converter to adjust a voltage to provide the first electric drive and the second electric drive respectively.

15. The electric vehicle of claim 14, wherein the duty cycle of the first half-bridge buck converter and the duty cycle of the second half-bridge buck converter are controlled individually to provide different voltages to the first electric drive and the second electric drive.

16. The electric vehicle of claim 12, wherein the third operating mode includes configuring the at least two battery packs in series and one of clamping a portion of the first half-bridge buck converter and the second half-bridge buck converter.

17. The electric vehicle of claim 12, wherein the third operating mode includes configuring the at least two battery packs in series and one of clamping a portion of the first half-bridge buck converter and the second half-bridge buck converter and bypassing the first half-bridge buck converter and the second half-bridge buck converter.

18. An electric drive system comprising:
a first electric drive;
a second electric drive;
a switchable battery including at least two battery packs that are selectively arranged in one of a series configuration and a parallel configuration;
a first half-bridge buck converter connecting the first electric drive to a first battery back of the at least two battery packs of the switchable battery;
a second half-bridge buck converter connecting the second electric drive to a second battery back of the at least two battery packs of the switchable battery; and
a controller configured to control a configuration of the switchable battery, an operation of the first half-bridge buck converter, and the second half-bridge buck converter,
wherein the controller is configured to operate the electric drive system in one of a first operating mode, a second operating mode and a third operating mode, wherein each of the operating modes define a different configuration arrangement of the switchable battery, an operation of the first half-bridge buck converter, and the second half-bridge buck converter, and
wherein the controller configures the at least two battery packs in parallel based at least in part on a rotational speed of one or more of the first electric drive and the second electric drive being below a first threshold level and configures the at least two battery packs in series based at least in part on a rotational speed of one or more of the first electric drive and the second electric drive being above a second threshold level.

19. The electric vehicle of claim 12, wherein the controller is configured to determine an operating mode of the electric drive system based at least in part on a rotational speed of one or more of the first electric drive and the second electric drive.

20. The electric vehicle of claim 19, wherein the controller is configured to only transition between the first operating mode and the second operating mode and between the second operating mode and the third operating mode.

* * * * *